(12) United States Patent
Iyer et al.

(10) Patent No.: US 10,521,009 B2
(45) Date of Patent: Dec. 31, 2019

(54) METHOD AND APPARATUS FOR FACILITATING INTERACTION WITH VIRTUAL REALITY EQUIPMENT

(71) Applicant: SAMSUNG ELECTRONICS CO., LTD., Suwon-si (KR)

(72) Inventors: Kiran Nanjunda Iyer, Karnataka (IN);
Viswanath Gopalakrishnan, Karnataka (IN); Kapil Soni, Karnataka (IN);
Satish Lokkoju, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/597,442

(22) Filed: May 17, 2017

(65) Prior Publication Data
US 2017/0336878 A1    Nov. 23, 2017

(30) Foreign Application Priority Data

May 17, 2016   (IN) .............................. 201641017074
Nov. 16, 2016   (IN) .............................. 2016 41017074

(51) Int. Cl.
*G06F 3/01*       (2006.01)
*G06F 3/0346*   (2013.01)
*G06F 1/16*       (2006.01)
*G06F 3/0354*   (2013.01)
*G06F 3/0362*   (2013.01)
*G06F 3/038*     (2013.01)

(52) U.S. Cl.
CPC .............. *G06F 3/011* (2013.01); *G06F 1/163* (2013.01); *G06F 3/038* (2013.01); *G06F 3/0346* (2013.01); *G06F 3/0362* (2013.01); *G06F 3/03547* (2013.01)

(58) Field of Classification Search
CPC ................................................ G06F 3/011–015
See application file for complete search history.

(56) References Cited

U.S. PATENT DOCUMENTS

| 5,001,632 A | * | 3/1991 | Hall-Tipping ..... A61B 5/02455 463/23 |
| 6,556,222 B1 | | 4/2003 | Narayanaswami |
| 7,224,326 B2 | | 5/2007 | Sefton |
| 8,937,640 B2 | | 1/2015 | Steuart, III |

(Continued)

FOREIGN PATENT DOCUMENTS

| EP | 3043237 A1 | 7/2016 |
| WO | 02/005904 A1 | 1/2002 |

OTHER PUBLICATIONS

International Search Report and Written Opinion (PCT/ISA/210 & PCT/ISA/237) dated Aug. 17, 2017 issued by the International Searching Authority in counterpart International Application No. PCT/KR2017/005080.

(Continued)

*Primary Examiner* — Patrick F Marinelli
(74) *Attorney, Agent, or Firm* — Sughrue Mion, PLLC

(57) ABSTRACT

A method, which facilitates interaction with virtual reality device, includes receiving a user input via a wearable device; extracting a parameter and a value of the parameter from the user input; transmitting the parameter and the value of the parameter to the VR device; identifying an action corresponding to the parameter and the value; and executing the action.

16 Claims, 13 Drawing Sheets

(56) References Cited

U.S. PATENT DOCUMENTS

| | | | |
|---|---|---|---|
| 9,007,401 B1 | 4/2015 | Cho et al. | |
| 9,448,621 B2* | 9/2016 | Reponen | G04G 9/007 |
| 10,001,817 B2* | 6/2018 | Zambetti | G06F 1/1694 |
| 10,025,399 B2* | 7/2018 | Kim | G06F 3/0362 |
| 10,037,084 B2* | 7/2018 | Joo | G02B 27/0172 |
| 10,108,256 B2* | 10/2018 | Shiu | G06F 3/011 |
| 10,168,978 B2* | 1/2019 | Ro | G06F 3/1454 |
| 2003/0225927 A1* | 12/2003 | Goodman | G06F 9/44505 |
| | | | 719/320 |
| 2011/0157046 A1* | 6/2011 | Lee | G04G 21/08 |
| | | | 345/173 |
| 2012/0306920 A1* | 12/2012 | Bathiche | A63F 13/10 |
| | | | 345/633 |
| 2013/0169680 A1* | 7/2013 | Chien | G06F 3/011 |
| | | | 345/633 |
| 2014/0109004 A1* | 4/2014 | Sadhvani | G06F 3/0482 |
| | | | 715/810 |
| 2014/0160055 A1 | 6/2014 | Margolis et al. | |
| 2014/0171201 A1* | 6/2014 | May | A63F 13/06 |
| | | | 463/35 |
| 2014/0347289 A1* | 11/2014 | Suh | G06F 3/017 |
| | | | 345/173 |
| 2014/0364212 A1* | 12/2014 | Osman | A63F 13/213 |
| | | | 463/31 |
| 2015/0111558 A1* | 4/2015 | Yang | G04G 21/04 |
| | | | 455/418 |
| 2015/0160621 A1* | 6/2015 | Yilmaz | G04G 9/0064 |
| | | | 368/10 |
| 2015/0346834 A1 | 12/2015 | Martinez Fernandez et al. | |
| 2015/0347080 A1* | 12/2015 | Shin | G09G 3/001 |
| | | | 345/173 |
| 2015/0370529 A1* | 12/2015 | Zambetti | G06F 1/1694 |
| | | | 345/156 |
| 2016/0029899 A1 | 2/2016 | Kim et al. | |
| 2016/0034042 A1* | 2/2016 | Joo | G02B 27/0172 |
| | | | 345/633 |
| 2016/0054565 A1* | 2/2016 | Izumihara | G09G 5/00 |
| | | | 345/8 |
| 2016/0054791 A1* | 2/2016 | Mullins | G04G 21/00 |
| | | | 345/173 |
| 2016/0091867 A1* | 3/2016 | Mansour | G06F 1/163 |
| | | | 368/294 |
| 2016/0124499 A1* | 5/2016 | Shiu | G06F 3/011 |
| | | | 715/778 |
| 2017/0024933 A1* | 1/2017 | Shuster | G06F 3/013 |
| 2017/0086732 A1* | 3/2017 | Tribble | A61B 5/4809 |
| 2017/0123487 A1* | 5/2017 | Hazra | G06F 3/015 |
| 2017/0168461 A1* | 6/2017 | Bang | G04B 19/04 |
| 2017/0232346 A1* | 8/2017 | Rofougaran | A63F 13/235 |
| | | | 463/2 |
| 2017/0269715 A1* | 9/2017 | Kim | G06F 3/0362 |
| 2017/0285754 A1* | 10/2017 | Holman | G06F 1/163 |
| 2017/0322622 A1* | 11/2017 | Hong | G06F 3/012 |
| 2017/0336878 A1* | 11/2017 | Iyer | G06F 1/163 |
| 2017/0337742 A1* | 11/2017 | Powderly | G06F 3/012 |
| 2018/0011555 A1* | 1/2018 | Park | G06F 3/011 |
| 2018/0059897 A1* | 3/2018 | Jo | G04C 3/005 |
| 2018/0246565 A1* | 8/2018 | Moon | G06F 3/012 |
| 2018/0292911 A1* | 10/2018 | Stafford | A63F 13/213 |
| 2018/0299973 A1* | 10/2018 | Kim | G06F 3/0362 |
| 2019/0011980 A1* | 1/2019 | Shiu | G06F 3/011 |
| 2019/0018444 A1* | 1/2019 | Huang | G02B 27/017 |

OTHER PUBLICATIONS

Victor Luckerson, "This Airline Is Giving Passengers Virtual Reality Headsets", http://time.com/3687546/virtual-reality-airline/, Jan. 29, 2015, total 2 pages.

LexInnova Technologies LLC, "Virtual Reality: Patent Landscape Analysis", 2015, total 19 pages.

Communication dated Jan. 23, 2019, from the European Patent Office in counterpart European Application No. 17799636.0.

* cited by examiner

FIG. 10A
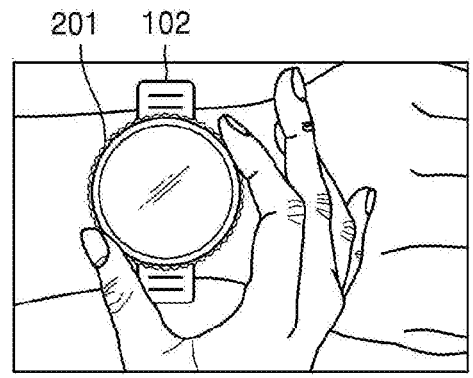
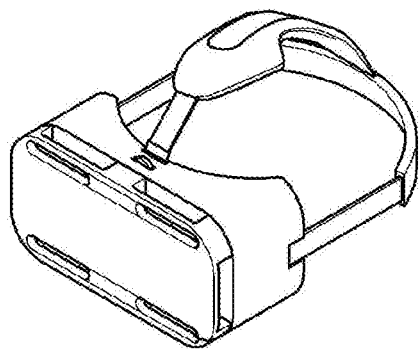
FIG. 10B
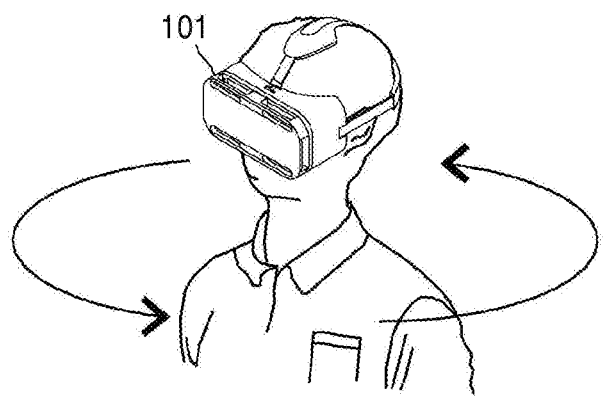

METHOD AND APPARATUS FOR FACILITATING INTERACTION WITH VIRTUAL REALITY EQUIPMENT

CROSS-REFERENCE TO RELATED APPLICATIONS

The present application claims priority to Indian Provisional Patent Application No. 201641017074 filed on May 17, 2016, and Indian Patent Application No. 201641017074 filed on Nov. 16, 2016, which are incorporated herein by reference in their entireties.

BACKGROUND

The exemplary embodiments relate to Virtual Reality (VR) equipment and, more particularly, to interacting with VR equipment or navigating a Virtual Environment generated by the VR equipment.

Virtual Reality (VR) is a Virtual Environment provided by a computer technology to a user. Various efforts are being made to apply virtual reality technology to advance various fields. This technology involves real-time simulation and provides an immersive experience to users. Currently, various devices are available which can provide a virtual reality experience to users. One such device is the VR headset. With the help of audio and video, a three-dimensional (3D) world is created around the user, and the user can interact with and modify objects displayed in the virtual environment through user inputs.

The VR headsets provide a 360-degree viewing experience. The user can interact with VR headsets using buttons and/or switches that are mounted on the headsets. In the related art VR headsets, controlling the headset while experiencing the virtual environment may be cumbersome for the user whose intention is to be immersed in the virtual reality environment. As another example, to achieve a complete 360-degree viewing experience, the user needs to physically turn 360 degrees, which might not be possible in every situation. Moreover, while the user is engaged in the virtual reality environment, there is no built-in mechanism to handle or view urgent messages received via other devices.

SUMMARY

The exemplary embodiments may address at least the above problems and/or disadvantages and other disadvantages not described above. Also, the exemplary embodiments are not required to overcome the disadvantages described above, and may not overcome any of the problems described above.

One or more example embodiments provide control functions of a VR equipment via a bezel, display, or sensor of a smart watch.

One or more example embodiments provide control of spatial navigation of the VR equipment via a bezel, display, or sensor of a smart watch.

One or more example embodiments provide control of temporal navigation of the VR equipment via a bezel, display, or sensor of a smart watch.

One or more example embodiments provide control of social network related functions of the VR equipment via a bezel, display, or sensor of a smart watch.

One or more example embodiments provide control of any of the abovementioned functions, spatial navigation, temporal navigation, or social network functions via a motion input provided by the user while wearing the smart watch.

According to an aspect of an example embodiment, there is provided a method of interacting with Virtual Reality (VR) equipment or navigating a Virtual Environment generated by the VR equipment. At least one user input is received via a wearable device. Further, at least one control parameter and a value of the at least one parameter are extracted from the at least one user input, by the wearable device. The at least one control parameter and corresponding value are transmitted to the VR equipment, by the wearable device. Further, at least one action corresponding to the at least one parameter and the value is identified by the VR equipment. Further, the at least one action is executed by the VR equipment.

According to an aspect of an example embodiment, there is provided a virtual reality system that includes a hardware processor, and a non-volatile memory including instructions. The hardware processor, upon executing the instructions, is configured to receive at least one user input via a wearable device. Further, at least one control parameter and a value of the at least one parameter is extracted from the at least one user input, by the wearable device. The at least one control parameter and corresponding value are transmitted to the VR equipment, by the wearable device. Further, at least one action corresponding to the at least one parameter and the value is identified by the VR equipment. Further, the at least one action is executed by the VR equipment.

BRIEF DESCRIPTION OF THE DRAWINGS

The above and/or other aspects will become more apparent by describing certain exemplary embodiments with reference to the accompanying drawings, in which:

FIGS. 10A and 10B are an example of controlling temporal navigation of a virtual environment using the wearable device, according to an example embodiment;

DETAILED DESCRIPTION

Figure 1:
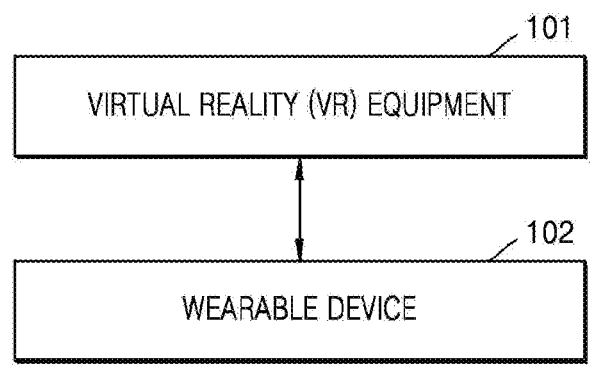
FIG. 1 illustrates a block diagram depicting connection between Virtual Reality (VR) equipment and a wearable device capable of interaction with the VR equipment, according to an example embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments may be practiced without those specifically defined matters. Also, well-known functions or constructions are not described in detail since they would obscure the description with unnecessary detail.

FIG. 1 illustrates a block diagram depicting connection between Virtual Reality (VR) equipment 101, e.g., a VR device, and a wearable device capable interaction with the VR equipment, according to an example embodiment. The VR equipment 101 may be any device that supports a VR function, and which may communicate with at least one wearable device 102. Further, at least one function of the VR equipment 101 and/or of at least one application in the VR equipment 101 may be controlled using the wearable device 102. The VR equipment 101 may be further configured to transmit selected data pertaining to at least one function of the VR equipment 101 and/or at least one application in the VR equipment 101 to the wearable device 102 such that at least one function of the VR equipment 101 and/or at least one application in the VR equipment may be integrated with the wearable device 102, which in turn allows one or more selected function(s) to be controlled by the wearable device 102. An example of the VR equipment 101 is a VR headset, however, the example embodiments are not limited thereto. The VR equipment 101 may be any device capable of generating and/or projecting a virtual image or virtual environment to a user. The VR equipment 101 may be further configured to receive information associated with a user input provided via the wearable device 102 and identify at least one action to be performed based on the information. For example, the information may include parameters associated with the user input, along with values of the parameters. The user input may be, for example, a touch input provided by a user via a bezel 201 of the wearable device, but is not limited thereto. The user input may be a touch input provided by the user via a display of the wearable device, a motion input provided by the user via the wearable device, or the like. For example, the user input may also be a touch input provided by the user via a sensor of the wearable device, a touch pad, a touch sensor, a fingerprint sensor, or the like. The user input may be a voice input provided by the user via a microphone included in the wearable device. The user input may be a motion input provided by the user while wearing or holding the wearable device, and the wearable device may include a sensor such as an accelerometer, a gyroscope, an altimeter, a motion sensor, or the like capable of detecting motion or position.

The VR equipment 101 may be further configured to perform the identified action, in response to the user input. The VR equipment 101 is further configured to collect at least one input pertaining to physiological factors of the user, determine a physiological state of the user, identify at least one action mapped to the determined physiological state, and perform the at least one action.

The wearable device 102 may include settings and configurations stored thereon which pertain to different functions of the VR equipment 101 and of at least one application installed on the VR equipment 101. The at least one application is not limited to an application installed on the VR equipment 101. For example, the application may be installed on the wearable device 102, or on a user device connected to the VR equipment 101 and/or the wearable device 102, and a user interface of the application may be displayed to the user within the virtual environment. For the sake of brevity, references to 'application installed on the VR equipment', 'application in the VR equipment', or the like within the present specification may include an application installed on the VR equipment 101 or any application which is installed on a different device (e.g., the wearable device 102, a user device, etc.) but whose user interface is displayed and controllable within the virtual environment generated by the VR equipment 101. The settings and configurations may be stored on device storage of the wearable device 102 or device storage accessible by the wearable device 102. The wearable device 102 may include a bezel, touch screen, or sensor via which a user can interact with the wearable device 102, and in turn, with the VR equipment 101. The wearable device 102 may display data including settings, configurations, parameter values corresponding to different functions of the VR equipment 101 and of at least one application in the VR equipment 101, using a display interface (e.g., a user interface displayed on a hardware display) of the wearable device 102. The wearable device is further configured to be connected at least one piece of VR equipment 101, through a communication channel, to facilitate control of at least one function of the VR equipment 101 and/or of at least one application in the VR equipment 101. The user may interact with and control the VR equipment 101, by providing input(s) on the bezel 201 of the wearable device 102. The wearable device 102 is further configured to process the received user input, compute values of at least one parameter associated with the user input, and transmit the parameter(s) and associated values to the VR equipment 101. In various example embodiments, by using the bezel input, a user may control at least one of a spatial movement, temporal movement, social network, and any such application and/or function of the VR equipment 101. In other various example embodiments, by providing a touch input via, for example, a touch display, a touch pad, or a touch sensor of the wearable device 102, or by providing a motion input using the wearable device 102, a user may control any of the abovementioned movements, applications, and functions. The wearable device 102 may internally or externally include at least one sensor capable of collecting real-time information pertaining to at least one parameter associated with mental and/or physiological factors of the user, and provide the collected information to the VR equipment 101.

Figure 2:
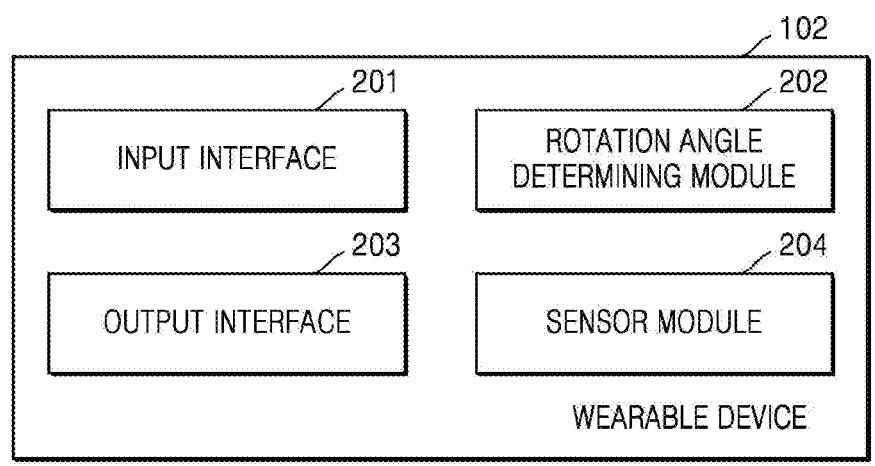
FIG. 2 is a block diagram depicting components of the wearable device, according to an example embodiment.

FIG. 2 is a block diagram depicting components of the wearable device, according to an example embodiment. The wearable device 102 may include a bezel 201, i.e., a bezel input interface, a rotation angle determining module 202, e.g., a rotation angle detecting sensor, an output interface 203, and a sensor module 204.

The bezel 201 may be moveable in at least one of horizontal and vertical directions and horizontal and vertical axial directions with respect to a plane of the wearable device 102 so as to allow user interaction with the wearable device 102, and in turn with at least one piece of connected VR equipment 101. By moving and/or rotating the bezel 201 according to set movements and/or amounts of rotation, the user can change views, navigate through options, and/or control different functions of the VR equipment 101. In various example embodiments, using the bezel 201, a user may control spatial as well as temporal movements in a display of the VR equipment 101. The wearable device 102 can receive a user touch input via the bezel 201, which in turn may be used to invoke a selected function in the VR equipment 101.

The rotation angle determining module 202 may determine a rotation angle with respect to movement of the bezel 201 in any permitted direction. The rotation angle determining module 202 may monitor real-time changes in the rotation angle, and collect information such as, but not limited to, rotation direction, initial position of the bezel 201 before rotation, final position of the bezel 201 after the rotation, and speed of rotation pertaining to movement of the bezel 201, and determine a rotation angle with respect to the detected movement. The rotation angle determining module 202 may be further configured to provide the determined rotation angle to the VR equipment 101, through the output interface 203.

The output interface 203 may provide at least one channel with communication protocols that allow the wearable device 102 to interact with, and control function(s) of, at least one piece of VR equipment 101.

The sensor module 204 may include or be connected to at least one sensor, internally or externally connected to the wearable device 102, that can sense one of more physiological parameters of the user. In an example embodiment, at least one sensor included in or connected to the sensor module 204 may be an accelerometer, gyroscope, altimeter, a motion sensor, or any sensor capable of sensing motion. In another example embodiment, at least one sensor included in or connected to the sensor module 204 may be a sensor capable of receiving user inputs, for example, a touch sensor, a touch pad, or a sensor integrated in a touch display. In still another example embodiment, at least one sensor included in or connected to the sensor module 204 may be a sensor for the status of user body such as sensing a heart rate, temperature of the user and/or sweat rate of the user or for user verification, for example, a fingerprint sensor. The sensor module 204 may then provide the information pertaining to the sensed physiological parameters and corresponding value(s) to the VR equipment 101. Although a hardware processor of the wearable device 102 is not depicted in FIG. 2, the hardware processor may be implemented in the wearable device 102 to include the bezel 201, i.e., the bezel input interface, rotation angle determining module, the output interface 203, and/or the sensor module 204 for executing proper functions in a real world system. Alternately, the bezel input interface and the output interface 203 may be implemented as one interface in a wearable device 102.

Figure 3:
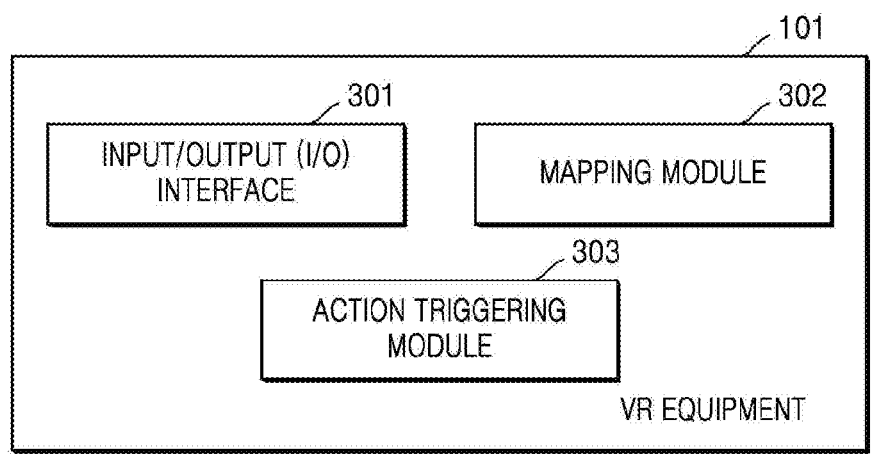
FIG. 3 is a block diagram depicting components of the VR equipment, according to an example embodiment.

FIG. 3 is a block diagram depicting components of the VR equipment, according to an example embodiment. The VR equipment 101 includes an Input/Output (I/O) interface 301, a mapping module 302, i.e., a mapping processor, and an action triggering module 303, e.g., an action triggering processor.

The I/O interface 301 may provide at least one channel with communication protocol(s) allowing the VR equipment to be connected to, and interact with, one or more wearable devices 102. In various example embodiments, the channel may be a wired or wireless connection. The VR equipment 101 may collect information pertaining to rotation angle with respect to a user input provided via bezel 201 of the wearable device 102, through the I/O interface 301.

The mapping module 302 may map the rotation angle to at least one action, wherein the action corresponds to at least one function of the mapping module 302 and/or of at least one application in the VR equipment 101. In various example embodiments, the mapping is done based on at least one parameter such as, but not limited to, a current context. The term 'current context' will be explained in further detail below. The mapping module 302 may be further configured to provide information pertaining to the at least one action to the action triggering module 303.

The action triggering module 303, upon receiving the information from the mapping module 302, may execute the action(s) as indicated in the received input. The action may be a temporal or spatial movement, or may be related to any function of the VR equipment 101 or of any application in the VR equipment 101. Although a processor of the VR equipment is not depicted in FIG. 3, the mapping module 302 and the action triggering module 303 may be embodied as one hardware processor or separate hardware processors.

Figure 4:
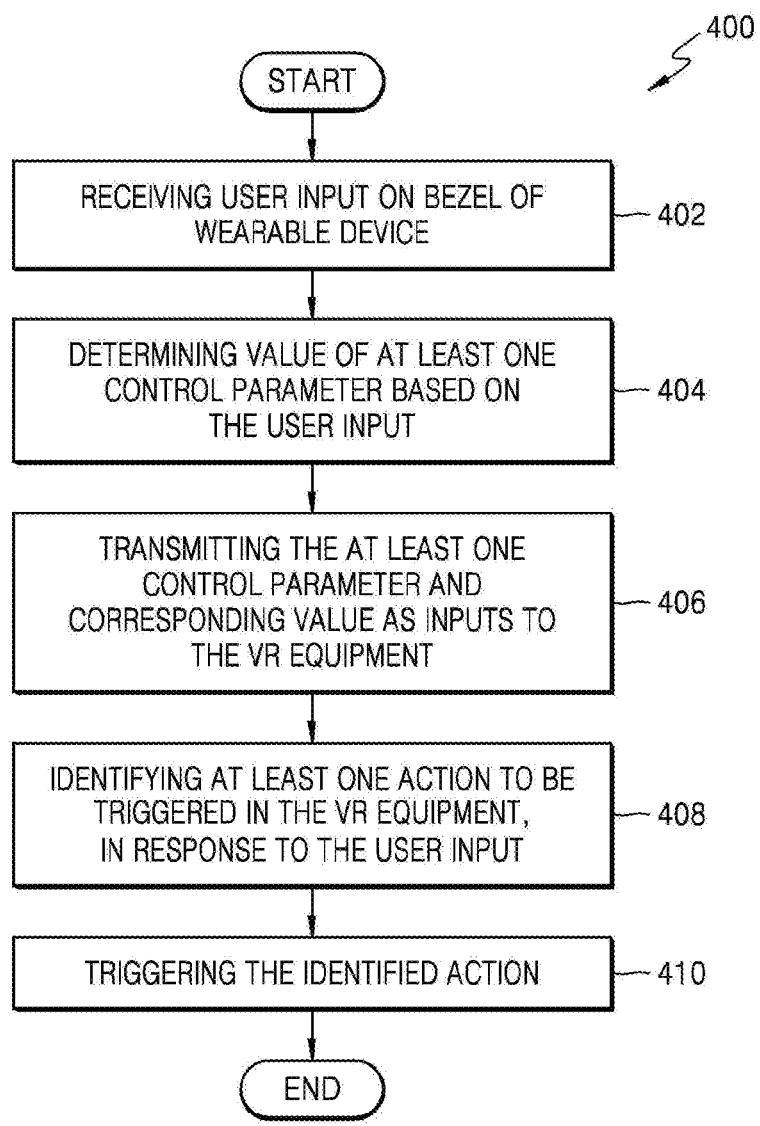
FIG. 4 is a flow diagram of controlling functions of the VR equipment using the wearable device, according to an example embodiment.
Figure 9:
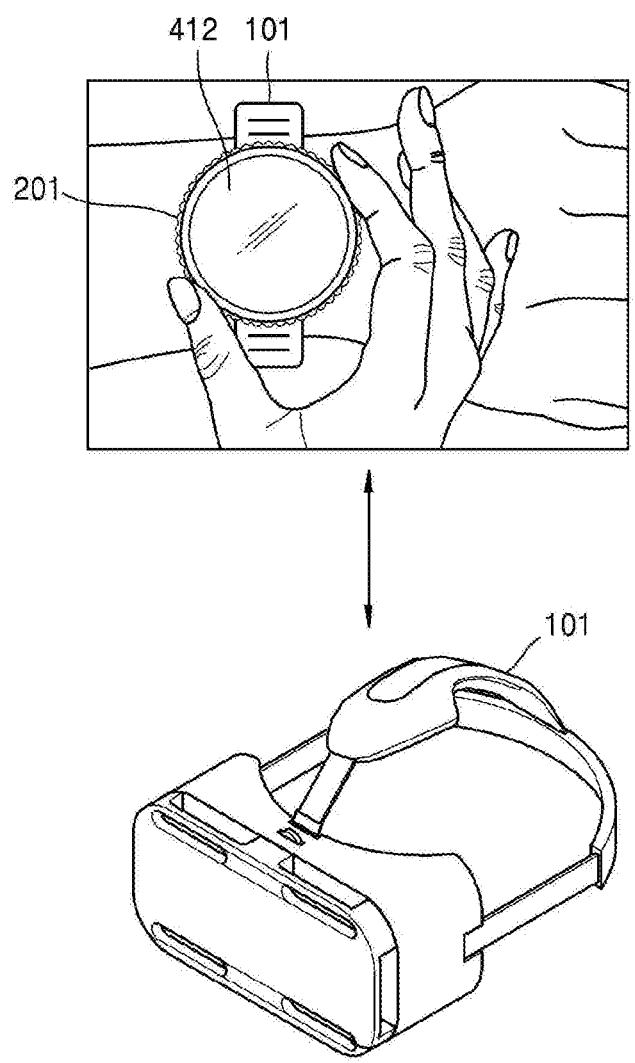
FIG. 9 is an example of controlling VR equipment using a wearable device, according to an example embodiment.

FIG. 4 is a flow diagram depicting steps involved in the process of controlling functions of the VR equipment using the wearable device, according to an example embodiment. While using the VR equipment 101, when the user wishes to interact with the VR equipment 101 (e.g., interact with a virtual environment projected by the VR equipment 101), the user may provide an input via the bezel 201 of the wearable device 102. For example, the VR equipment 101 may include a VR headset and the wearable device 102 may include a smart watch with a bezel 201, as depicted in FIG. 9. When the user provides an input via the bezel, for example by rotating the bezel in a particular direction, the wearable device 102 receives (operation 402) the input, processes the input, and may determine (operation 404) a value of at least one control parameter from the user input. For example, the control parameter may be 'rotation angle' determined based on rotation speed and rotation direction of the bezel. In another example, the control parameter may be at least one physiological parameter collected in real-time from the user.

The wearable device 102 may transmit (operation 406) the control parameter along with the determined value to the VR equipment 101. The VR equipment 101 may then identify (operation 408) at least one action corresponding to the control parameter and the determined value. That is, the VR equipment may identify at least one action to be triggered in response to the user input, based on the control parameter and the corresponding value as received from the wearable device 102, and trigger (operation 410), or execute, the identified at least one action.

The various operations in method 400 may be performed in the order presented, in a different order, or simultaneously. Further, in some example embodiments, some steps or operations listed in FIG. 4 may be omitted, or intermittent operations may be included.

The user input is not limited to a user input via the bezel 201. For example, the user input may be a touch input provided by the user via a display 412 of the wearable device 102, a motion input provided by the user via the wearable device 102, a speech input provided by the user via the wearable device 102, or the like.

For example, the display 412 may include a touch screen and the user may provide a touch input such as a tap input, a double tap input, a tap and hold input, a slide input, a pinch input, an expand input, or the like via a touch display of the wearable device 102.

In another example, the user may provide the touch input as above, but via a sensor of the wearable device, such as a touch sensor or touch pad provided on a wrist strap of the wearable device 102. The user may also provide the touch input via a button, switch, or combination of buttons, switches, and sensors provided on the wearable device 102.

For example, the user input may be a speech input provided by the user via a microphone included in the wearable device 102.

The user input may be a motion input provided by the user while wearing or holding the wearable device 102, and the wearable device 102 may include a sensor such as an accelerometer, a gyroscope, an altimeter, a motion sensor, or the like capable of detecting motion or position. For example, while wearing the wearable device 102 on his right wrist, the user may provide a motion input such as rotating his wrist right or left, moving his right arm forward, backward, left, right, up, and/or down, or shaking his right arm.

The user inputs may include a combination of the touch inputs, speech inputs, or motion inputs described above.

Figure 5:
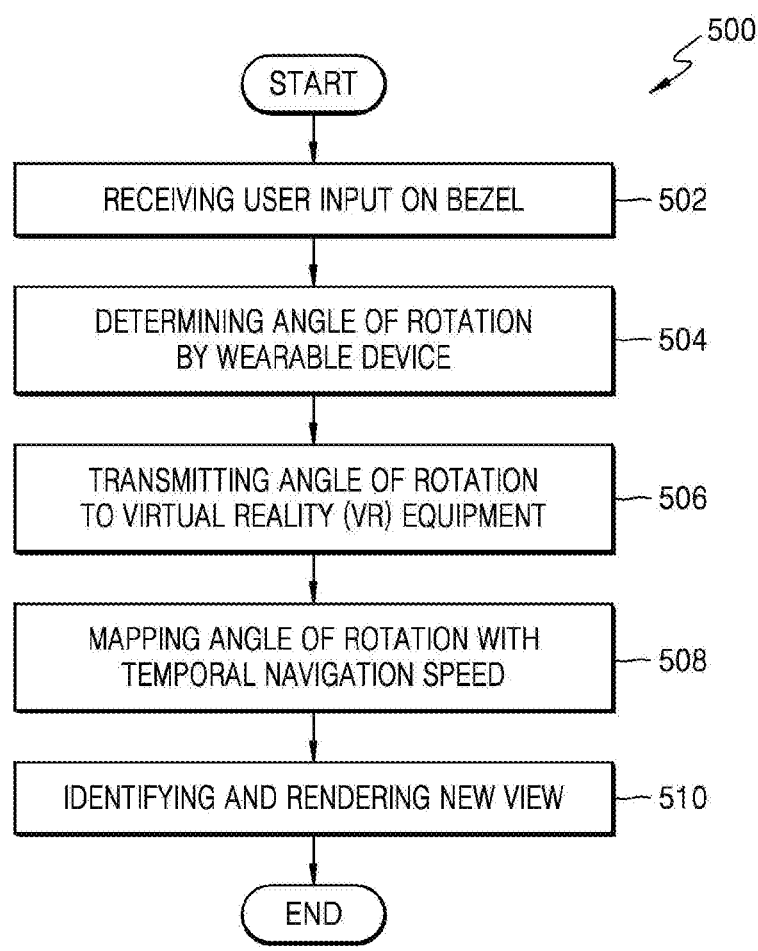
FIG. 5 is a flow diagram of controlling spatial navigation of a virtual environment using the wearable device, according to an example embodiment.

FIG. 5 is a flow diagram depicting steps involved in the process of controlling spatial navigation of a virtual environment using the wearable device, according to an example embodiment. While using the VR equipment 101 to view content (as depicted in FIG. 10B), a user may navigate the entirety of a 360-degree view by providing an input via the bezel 201 of the wearable device 102 (as depicted in FIG. 10A). The user may provide an input via the bezel, for example, by rotating the bezel 201 in a clockwise or counter-clockwise direction. The wearable device 102 receives (operation 502) the input, determines (operation 504) a 'rotation angle' corresponding to the input, and may transmit (operation 506) the determined rotation angle to the VR equipment 101.

The VR equipment 101 may then map (operation 508) rotation angle and a head position data with a temporal navigation speed, and identify a viewing angle or a view (e.g., a new view or a modified view) to be rendered in response to the user input. In an example embodiment, the head position data is determined by the VR equipment 101 using at least one sensor included in or connected to the VR equipment 101. The sensor may be, for example, an accelerometer, a gyroscope, an altimeter, a motion sensor, or the like capable of detecting motion or position. For example, the sensor may be integrated with a camera module connected (e.g., hardwired or wireless) to the VR equipment 101 and record movement of the user. The VR equipment 101 renders (operation 510) the identified view in a display associated with the VR equipment 101. For example, the VR equipment 101 may render the identified view via a display or projector which is built into or connected to the VR equipment 101. The user can further change the view by further turning the bezel 201.

The various operations in the method 500 may be performed in the order presented, in a different order or simultaneously. Further, in some example embodiments, some steps or operations listed in FIG. 5 may be omitted, or intermittent operations may be included.

The user inputs described above regarding FIG. 5 may be a combination of the touch inputs, speech inputs, and motion inputs described above in regard to FIG. 4.

For example, the user input may be a motion input provided by the user while wearing or holding the wearable device 102, and the wearable device 102 may include a sensor such as an accelerometer, a gyroscope, an altimeter, a motion sensor, or the like capable of detecting motion or position. While wearing the wearable device 102 on his right wrist, the user may provide a motion input such as extending his right arm in front of him and then raising his right arm above him. In such an example, the 'rotation angle' is based on the position of the user's right arm when extended forward, the position of the user's right arm when extended upward, and the user's arm motion.

Figure 6:
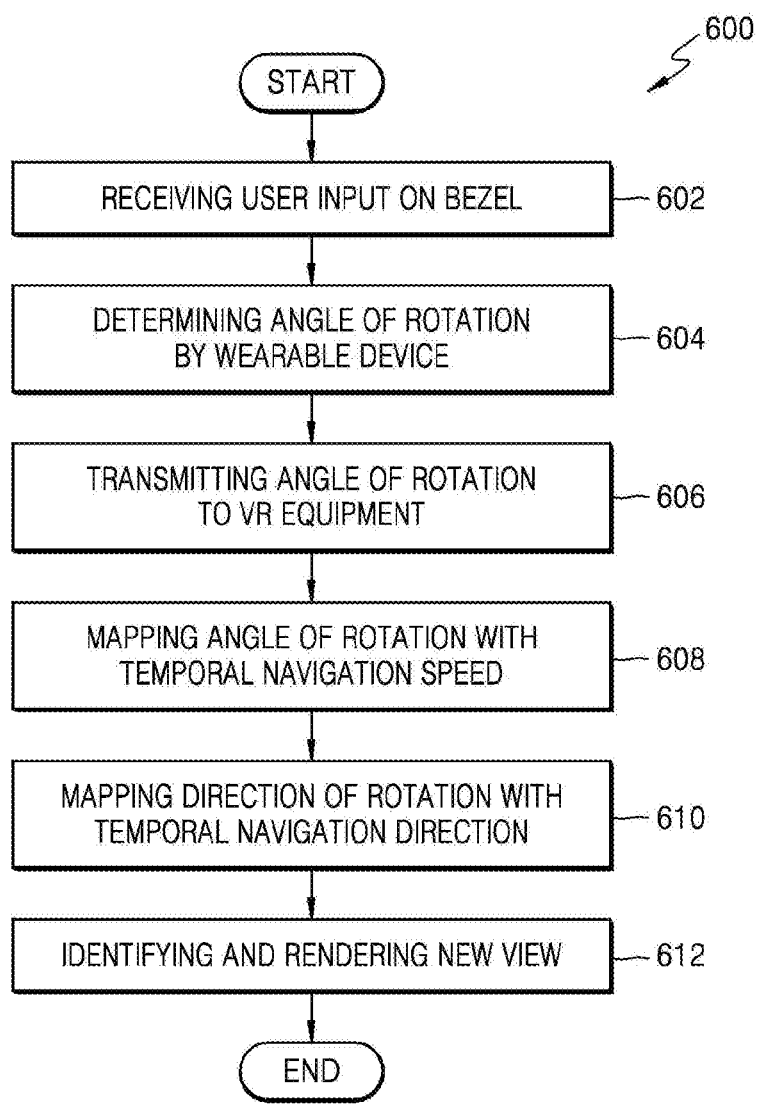
FIG. 6 is a flow diagram of controlling temporal navigation of a virtual environment using the wearable device, according to an example embodiment.
Figure 11:
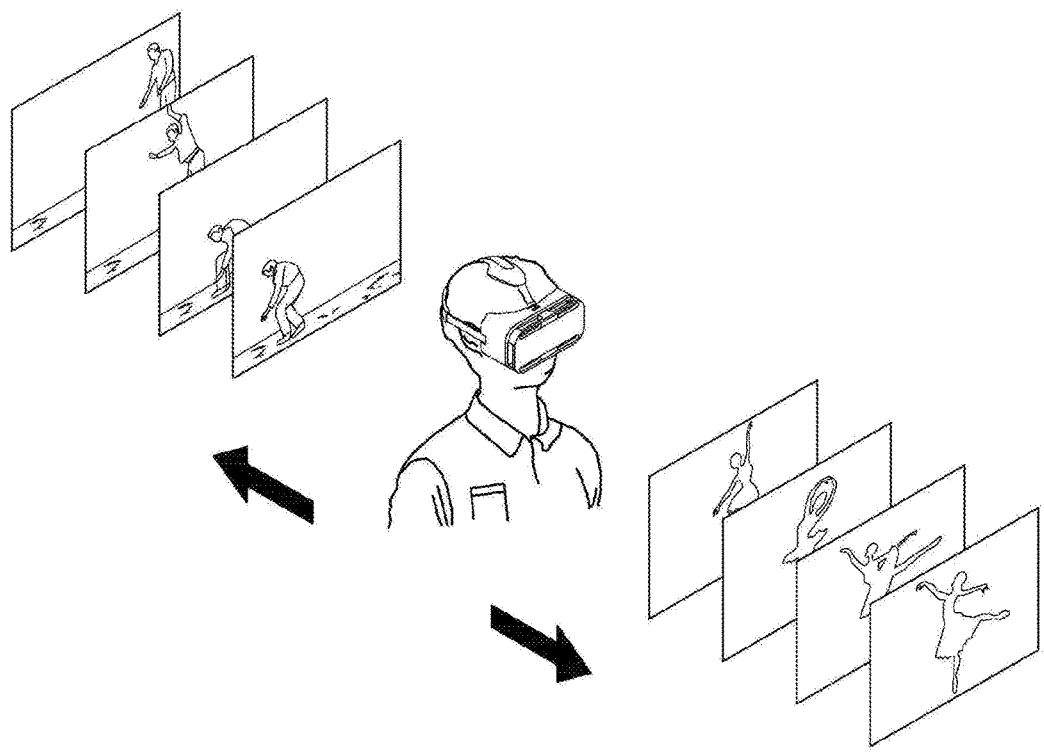
FIG. 11 is an example of controlling a social networking application, using the wearable device, according to an example embodiment.

FIG. 6 is a flow diagram depicting steps involved in the process of controlling temporal navigation of a virtual environment using the wearable device, according to an example embodiment. While using the VR equipment 101 to view content (as depicted in FIG. 11), a user may navigate the content by providing an input via the bezel 201 of the wearable device 102. The user may provide an input via the bezel, for example, by rotating the bezel 201 in a clockwise or counter-clockwise direction while viewing the content. The wearable device receives (operation 602) the input, processes the input, determines (operation 604) a 'rotation angle' corresponding to the received user input, and transmits (operation 606) the determined rotation angle to the VR equipment 101 along with a 'rotation direction' (which indicates the direction in which the bezel 201 was rotated by the user).

The VR equipment 101 may then map (operation 608) rotation angle with a temporal navigation speed. The VR equipment 101 may further map (operation 610) a rotation direction with a temporal navigation direction. Based on the mappings, the VR equipment 101 may identify a view (e.g., a new view or a modified view) to be rendered in response to the user input. The VR equipment renders (operation 612) the identified new view in the display associated with the VR equipment 101. The user can further change the view by further turning the bezel 201.

The various operations in method 600 may be performed in the order presented, in a different order or simultaneously. Further, in some example embodiments, some steps or operations listed in FIG. 6 may be omitted, or intermittent operations may be included.

The user inputs described above regarding FIG. 6 may be a combination of the touch inputs, speech inputs, and motion inputs described above in regard to FIGS. 4 and 5.

Figure 7:
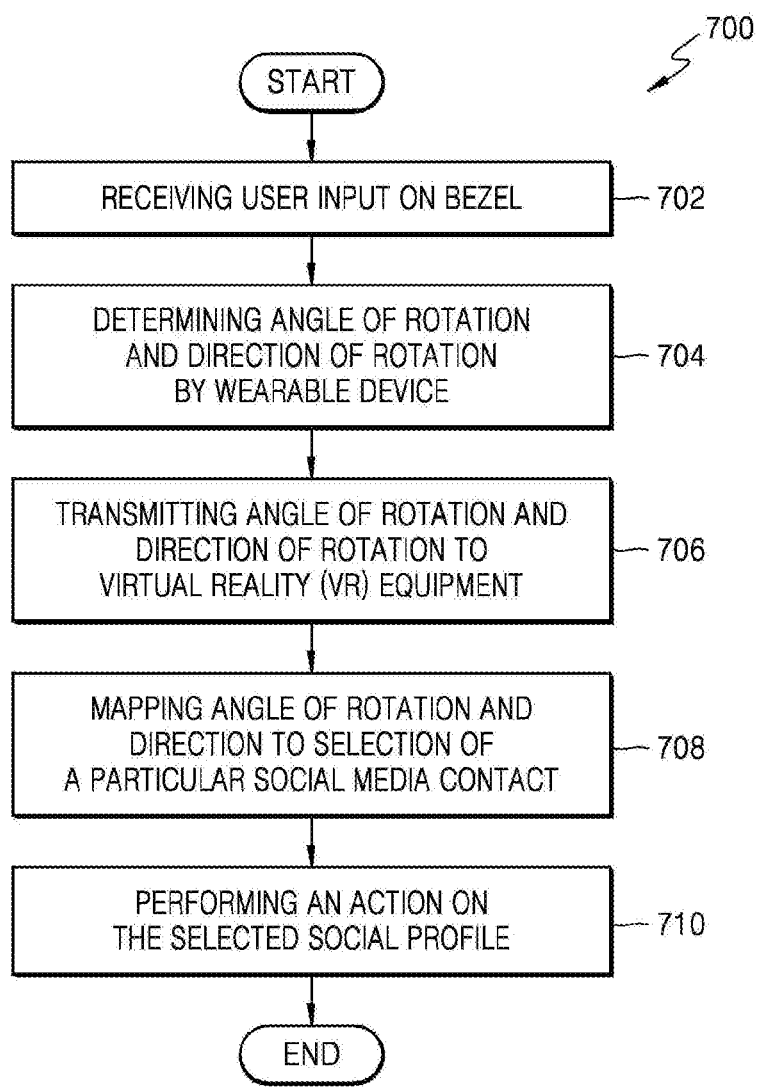
FIG. 7 is a flow diagram of accessing or controlling a social networking application, using the wearable device, according to an example embodiment.
Figure 12:
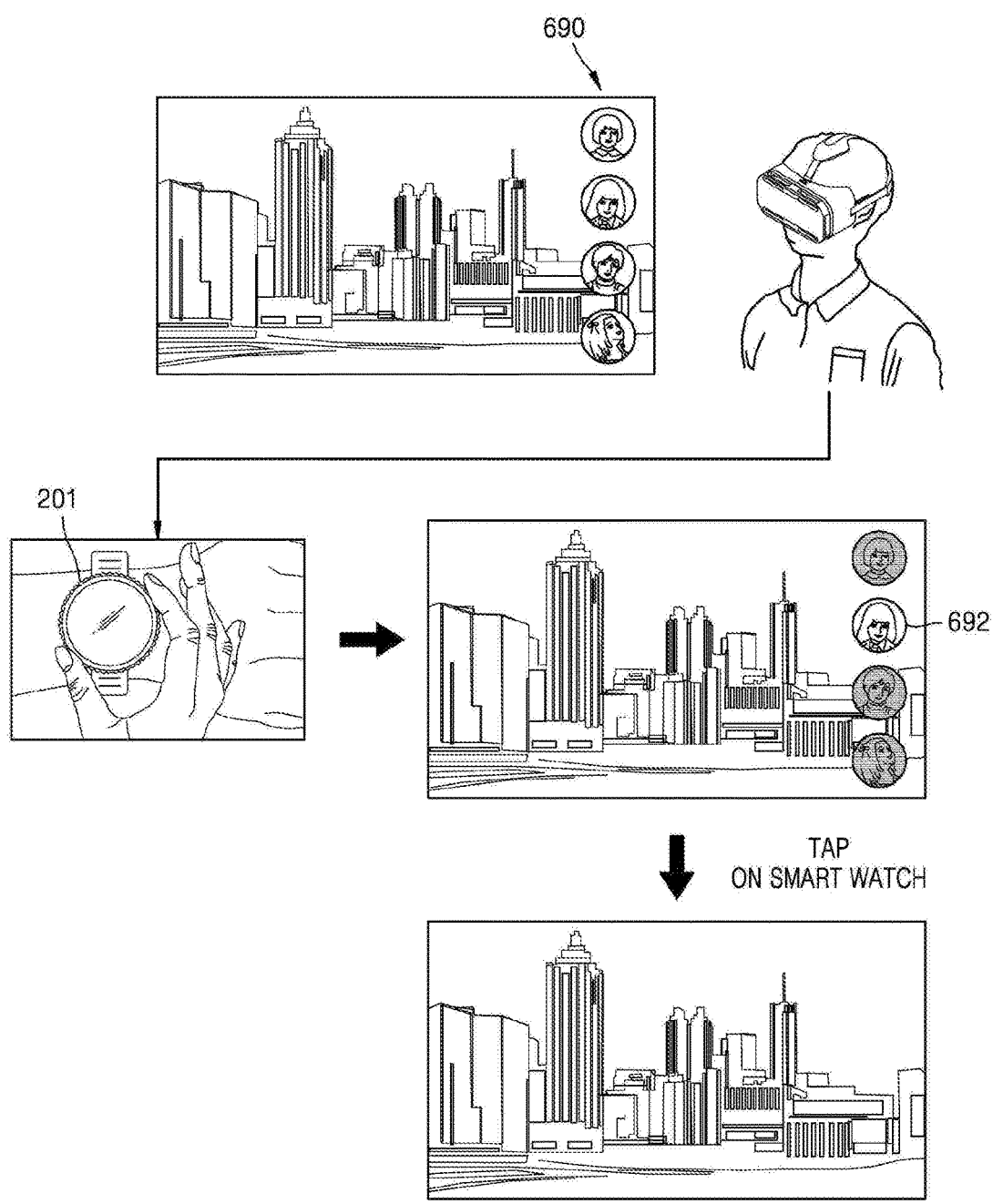
FIG. 12 is an example of device integration between the wearable device and the VR equipment, according to an example embodiment.

FIG. 7 is a flow diagram depicting steps involved in the process of accessing or controlling a social networking application, using the wearable device, according to an example embodiment. The VR equipment 101 may provide a social network mode or feature which allows a user of the VR equipment 101 to share content being watched on the display of the VR equipment 101 with at least one other person via a social networking application (e.g., a person listed in the user's friends list in a social networking application). For example, the user can log in to one or more social media applications via a user interface displayed within a virtual environment generated by the VR equipment 101, and upon logging in, the friends list is synchronized with the VR equipment 101. In an example embodiment, while using the VR equipment 101 to view content (as depicted in FIG. 12), the user may launch a social networking application by providing an input via the bezel 201. In another example embodiment, the social network may automatically be activated by the VR equipment 101 when the user begins watching any content via the VR equipment 101. When the social media mode is ON (e.g., while the social networking application is active and displayed in the virtual environment, or active with at least a portion of the application displayed in the virtual environment), the user can browse through a contact list 690 associated with the social networking application by rotating the bezel 201. The user can rotate the bezel in clockwise or counter-clockwise direction while browsing through the contact list. The wearable device 102 receives (operation 702) the input provided via the bezel, determines (operation 704) 'rotation angle' and 'rotation direction' corresponding to the received user input, and transmits (operation 706) the determined rotation angle and the rotation direction to the VR equipment 101.

The VR equipment 101 then maps (operation 708) the rotation angle and the rotation direction with a contact 692 in the contact list, identifying that particular contact as the contact which the user wishes to contact. For example, the VR equipment 101 may highlight the contact or move a virtual arrow or indicator over the contact according to the rotation angle and rotation direction of the bezel 201. After the user selects the contact, the VR equipment 101 may present the user with options that may be performed in the social media mode. For example, the VR equipment 101 may present an option to instantly share the content being viewed, with the selected contact. The user can select the option by providing one or more inputs using the bezel 201, and the VR equipment 101 may perform (operation 710) the requested action (e.g., share the viewed content) in response to receiving the user input. In the example depicted in FIG. 12, the user provides an input to trigger sharing of the viewed content (e.g., taps a smart watch) with the selected contact, and the VR equipment 101 initiates sharing of the content with the selected contact.

The various operations in method 700 may be performed in the order presented, in a different order or simultaneously. Further, in some example embodiments, some steps or operations listed in FIG. 7 may be omitted, or intermittent operations may be included.

The user inputs described above regarding FIG. 7 may be a combination of the touch inputs, speech inputs, and motion inputs described above in regard to FIGS. 4 to 6.

Figure 8:
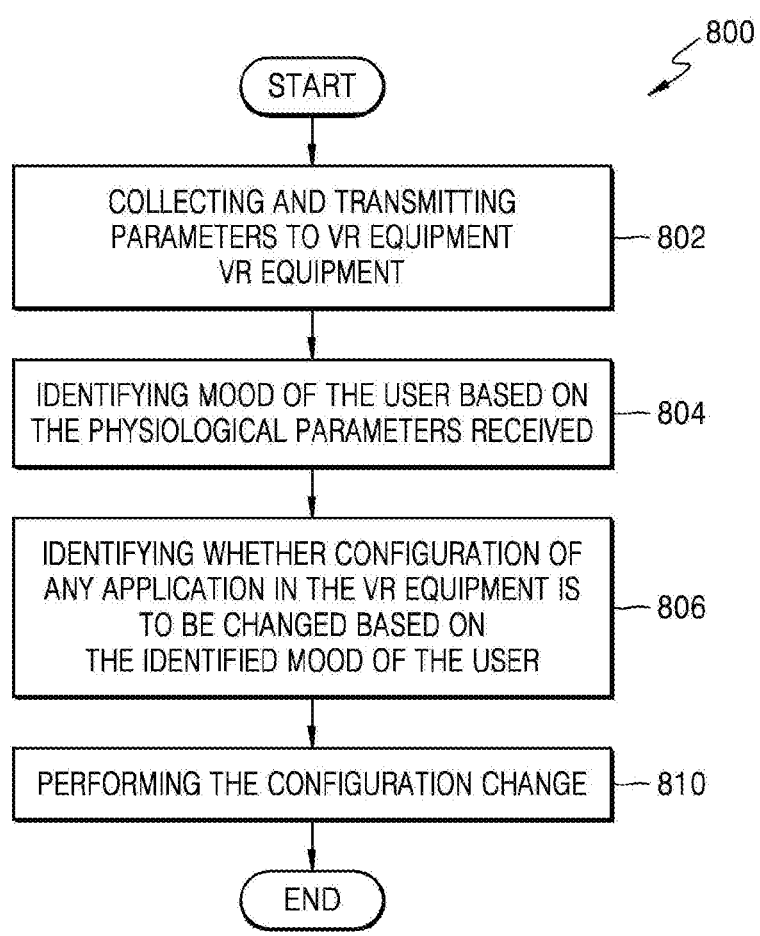
FIG. 8 is a flow diagram of changing a configuration of the VR equipment, according to an example embodiment.

FIG. 8 is a flow diagram depicting steps involved in the process of changing a configuration of the VR equipment, based on real-time mood information determined by the wearable device, according to an example embodiment. The term 'configuration change' can refer to changing a setting, settings, and/or a configuration of the VR equipment 101 and/or of at least one application in the VR equipment 101. A configuration change may include changing 'difficulty level' of a game displayed by or running on the VR equipment 101. In an example embodiment, the user may manually initiate the configuration change by providing an input (s) via the bezel 201. In another example embodiment, the configuration change may automatically be initiated by the VR equipment 101, based on real-time input(s) received from the wearable device 102.

For example, the wearable device 102 may monitor and collect information pertaining to one or more physiological parameters of the user. For example, one or more sensors included in the wearable device 102 may measure Blood Pressure (BP), heartbeat count and so on of the user, and the wearable device 102 may transmit (operation 802) the measurements to the VR equipment 101. The VR equipment 101 may process and analyze the physiological parameter(s) transmitted by the wearable device 102, and identify (operation 804) the mood of the user based on the parameter(s).

The VR equipment 101 may further identify (operation 806) whether to modify any configuration of the VR equipment 101 or of one or more applications in the VR equipment 101, based on the identified mood of the user. In an example embodiment, the VR equipment 101 may identify an application or configuration to be changed, based on at least one parameter such as, but not limited to, a 'current context'. The term 'current context' can refer to an application and/or a settings window displayed in the foreground of a virtual environment displayed by the VR equipment 101.

Figure 14:
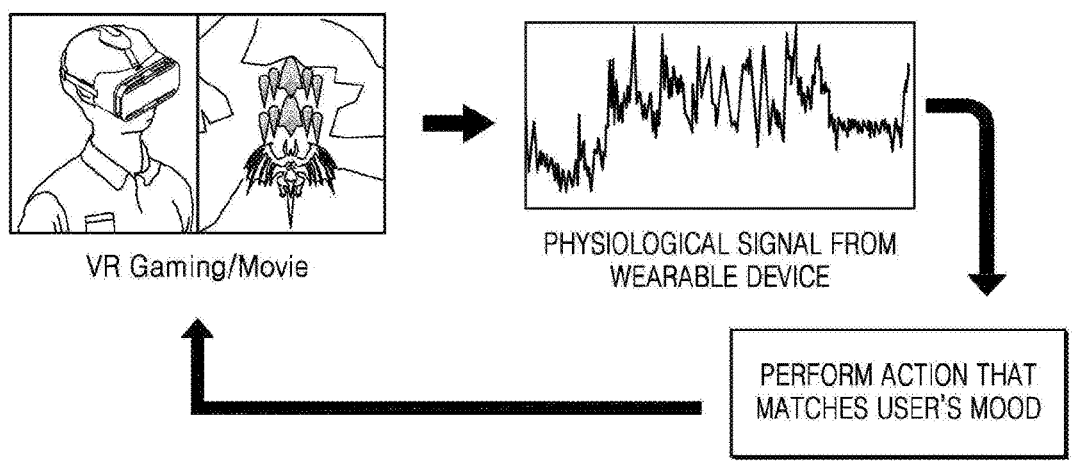

In an example embodiment, the VR equipment 101 may monitor or identify the mood and/or body status information of the user while the user plays a game displayed in the virtual environment (as depicted in FIG. 14). The game may be a gaming application installed on the VR equipment 101, the wearable device 102, or a device connected to the VR equipment. By associating the mood with the current context (the game), the VR equipment 101 can identify whether the user response to the game (for example, level of user excitement) matches a desired level as pre-configured. For example, the VR equipment 101 may change the speed, music level and/or effect of the game playing on the VR equipment based on the change of body status information based on at least one factor such as a heart rate, temperature of the user and/or a sweat rate of the user. For instance, if the heart rate of the user increases, the speed of the game is also increased in response thereto. If the VR equipment 101 identifies that the response does not match the desired level (e.g., level of user excitement is below the desired level), the VR equipment 101 may automatically perform a configuration change (operation 810). For example, in changing the configuration, the VR equipment 101 may increase the difficulty level of the game so that the user gets involved more in the game. For example, the VR equipment 101 may, for example, increase the music level of the game, volume level and/or a number of sound effects, or the like in order to enhance the user's experience.

Figure 13:
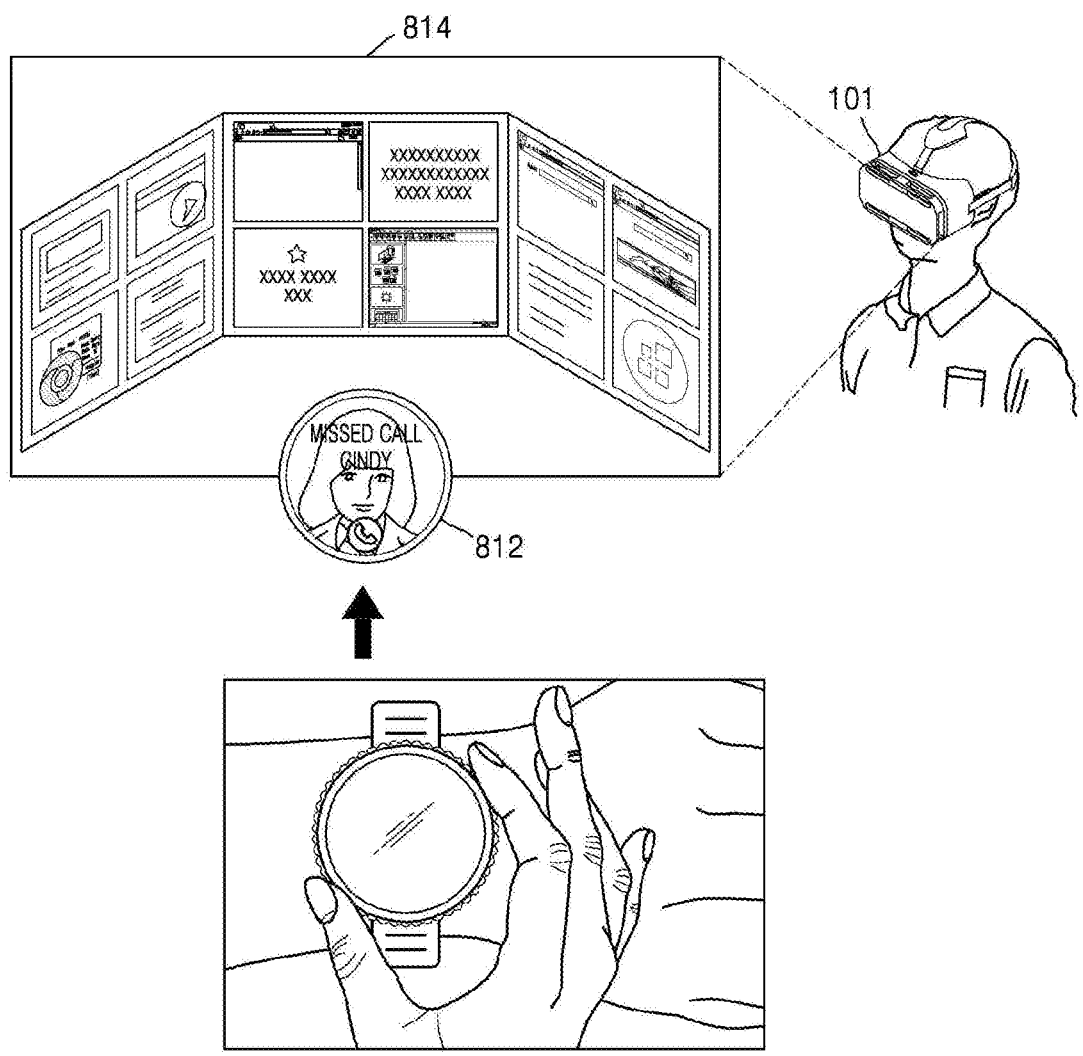
FIGS. 13 and 14 are examples of changing configurations of the VR equipment based on real-time inputs via the wearable device, according to an example embodiment.

Similarly, if interfacing of one or more user devices such as mobile phones with the VR equipment 101 is permitted (e.g., a connection allowing data transfer between one or more user devices and the VR equipment 101 is established), a user may access or view notifications from any of the user devices by providing inputs via the bezel 201, as depicted in FIG. 13.

In establishing a connection between one or more user devices and the VR equipment 101, the VR equipment 101 may for example send a connection request to a device. In response, the device may display a confirmation page or alert to the user, asking the user to accept or reject the connection request. Upon receiving an input from the user accepting the request, the device may transmit a confirmation message to the VR equipment 101.

For example, the VR equipment 101 may display a user interface of any of the user devices in a virtual environment displayed by the VR equipment 101.

For example, referring to FIG. 13, the VR equipment is a VR headset, and assuming a connection is already established between the VR equipment 101 and a smart watch of the user, the VR equipment 101 may display a user interface 812 of the smart watch when the user receives a call on the smart watch or has missed a call. Since the user interface of the smart watch is displayed in the virtual environment 814 projected by the VR equipment 101, and the user is able to enter touch or motion inputs via the smart watch, the user is able to interact with the smart watch while continuing to wear the VR equipment 101.

In another example, assuming that a connection is already established between the VR equipment 101, a smart watch of the user, and a device (e.g., a smart phone or tablet) connected to the VR equipment 101, the VR equipment 101 may display a user interface of the smart phone when the user receives a call on the smart phone or to alert the user of a missed call. The user interface of the smart phone is displayed in the virtual environment projected by the VR equipment 101, and the user is able to enter touch or motion inputs via the smart watch to control the smart phone, and thus the user is able to interact with the smart phone while continuing to wear the VR equipment 101.

The example embodiments are not limited thereto. That is, in addition to displaying a virtual environment, the VR equipment 101 may also display, in a region or the entirety of the virtual environment, the user interface of a mobile device. The VR equipment 101 may display the full user interface or a simplified user interface of the mobile device (e.g. a smart phone may switch to a simple user interface (UI) mode such as an accessibility mode when connected to the VR equipment 101, and the VR equipment 101 may display the simple UI within the virtual environment).

The VR equipment 101 is not limited to displaying the user interface of only one mobile device. The VR equipment 101 may display the user interfaces of multiple mobile devices simultaneously within the virtual environment.

The various operations in method 800 may be performed in the order presented, in a different order or simultaneously. Further, in some example embodiments, some steps or operations listed in FIG. 8 may be omitted, or intermittent operations may be included.

The user inputs described above regarding FIG. 8 may be a combination of the touch inputs, speech inputs, or motion inputs described above in regard to FIGS. 4 to 7.

The example embodiments disclosed herein may be implemented through at least one software program running on at least one hardware device and performing network management functions to control the elements disclosed herein. The VR equipment 101 and wearable device 102 shown in FIG. 1 include blocks which may be at least one of a hardware device, or a combination of hardware devices and software modules.

The example embodiments disclosed herein specify a mechanism for controlling VR equipment using one or more wearable devices. The mechanism allows control of at least one function of the VR equipment or of at least one application in the VR equipment via a wearable device, providing a system thereof.

Therefore, it is understood that the scope of protection is extended to such a system and by extension, to a computer readable means having a message therein, said computer readable means containing a program code for implementation of one or more steps of the method, when the program runs on a server or mobile device or any suitable programmable device. The method is implemented in a preferred example embodiment using the system together with a software program written in, for example, Very high speed integrated circuit Hardware Description Language (VHDL), another programming language, or implemented by one or more VHDL or several software modules being executed on at least one hardware device. The hardware device may be any kind of device which may be programmed including, for example, any kind of a computer like a server or a personal computer, or the like, or any combination thereof, for example, one processor and two FPGAs. The device may also include means which could be for example, hardware means like an application specific integration circuit (ASIC) or a combination of hardware and software means, an ASIC and an FPGA, or at least one microprocessor and at least one memory with software modules located therein. Thus, the means are at least one hardware means or at least one hardware-cum-software means. The example method embodiments described herein could be implemented in pure hardware or partly in hardware and partly in software.

Alternatively or additionally, the example embodiment may be implemented on different hardware devices, for example, using a plurality of CPUs.

The foregoing exemplary embodiments and advantages are merely exemplary and are not to be construed as limiting. The present teaching may be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method, which facilitates an interaction with a virtual reality (VR) device, the method comprising:
   receiving a user input and one or more physiological parameters of a user of the VR device at a wearable device, wherein the user input comprises an input provided by the user via a bezel of the wearable device;
   extracting a parameter and a value of the parameter from the user input, by the wearable device, wherein the parameter comprises a rotation angle or a rotation speed, of the bezel, and a rotation direction of the bezel;
   transmitting the parameter and the value of the parameter to the VR device, by the wearable device;
   identifying, by the VR device, an action, among a plurality of actions, corresponding to the parameter and the value, wherein the action comprises navigation of a virtual environment projected by the VR device and rendering a view within the virtual environment;
   mapping the rotation angle or the rotation speed with a temporal navigation speed of the virtual environment;
   mapping the rotation direction with a spatial navigation direction of the virtual environment;
   identifying a configuration of an interactive application, displayed in the virtual environment projected by the VR device, to be modified in the interactive application;
   modifying the configuration of the interactive application based on the one or more physiological parameters, the configuration corresponding to at least of a speed, a difficulty level, a music level, or sound effects of the interactive application; and
   executing, by the VR device, the action.

2. The method of claim 1, wherein the user input further comprises a touch input provided by the user via the bezel of the wearable device.

3. The method of claim 1, wherein the user input further comprises at least one from among a touch input provided by the user via the wearable device, and a motion input provided by the user via the wearable device.

4. The method of claim 1, wherein the identifying the action, among the plurality of actions, further comprises:
   mapping the parameter with the interactive application displayed in the virtual environment projected by the VR device; and
   identifying the action, among the plurality of actions, based on the interactive application and the parameter, the action including a control parameter which matches the parameter.

5. The method of claim 1, wherein the method further comprises:
   identifying a second action, among the plurality of actions, comprising accessing a social network, and accessing features of the social network;
   mapping the rotation angle with one of the features of the social network; and mapping the rotation direction with a navigation direction of the social network.

6. The method of claim 1, wherein the rendering the view further comprises:
acquiring a head position of the user, and
identifying at least one from among the view and a viewing angle of the view based on the head position of the user.

7. The method of claim 1, wherein the interactive application is a game displayed in the virtual environment.

8. A virtual reality (VR) system comprising:
a wearable device comprising:
an input interface configured to receive a user input and one or more physiological parameters of a user,
a processor configured to extract a parameter and a value of the parameter from the user input, wherein the parameter comprises a rotation angle or a rotation speed, of a bezel of the wearable device, and a rotation direction of the bezel, and
an output interface configured to transmit the parameter and the value of the parameter to a VR device connected to the VR system,
the VR device comprising:
an interface configured to receive the parameter and the value of the parameter, and
a hardware processor configured to:
identify an action, among a plurality of actions, corresponding to the parameter and the value, wherein the action comprises navigation of a virtual environment projected by the VR device and rendering a view within the virtual environment;
map the rotation angle or the rotation speed with a temporal navigation speed of the virtual environment; and
map the rotation direction with a spatial navigation direction of the virtual environment;
identify a configuration of an interactive application, displayed in the virtual environment projected by the VR device, to be modified in the interactive application,
modify the configuration of the interactive application based on the one or more physiological parameters, the configuration corresponding to at least one of a speed, a difficulty level, a music level, or sound effects of the interactive application, and
execute the action.

9. The VR system of claim 8, wherein the interactive application is installed on the VR device, the wearable device, or a device connected to the VR device, the one or more physiological parameters determines mood information of the user operating the VR device and the wearable device.

10. The VR system of claim 8, wherein the user input further comprises at least one from among:
a touch input provided by the user via the wearable device, and
a motion input provided by the user via the wearable device.

11. The VR system of claim 8, wherein the hardware processor of the VR device is further configured to identify the action, among the plurality of actions, by:
mapping the parameter with the interactive application displayed in the virtual environment projected by the VR device; and
identifying the action, among the plurality of actions, based on the interactive application and the parameter, the action including a control parameter which matches the parameter extracted from the user input.

12. The VR system of claim 8, wherein the hardware processor of the VR device is further configured to identify a second action, among the plurality of actions, comprising accessing a social network, and accessing features of the social network,
wherein the hardware processor of the VR device is further configured to identify the second action by:
mapping the rotation angle with one of the features of the social network; and
mapping the rotation direction with a navigation direction of the social network.

13. A virtual reality (VR) apparatus comprising:
an interface configured to receive, from a wearable device, a parameter and a value of the parameter extracted based on a user input, which has been input on the wearable device, and receive one or more physiological parameters of a user of the VR apparatus wherein the one or more physiological parameters being acquired by the wearable device, wherein the user input comprises an input provided by the user via a bezel of the wearable device, and wherein the parameter comprises a rotation angle or a rotation speed of the bezel, and a rotation direction of the bezel; and
a processor configured to execute an action, among a plurality of actions, corresponding to the parameter and the value of the parameter,
wherein the processor is further configured to:
identify the action, among the plurality of actions, as an action for navigation of a virtual environment projected by the VR apparatus and rendering a view within the virtual environment,
map the rotation angle or the rotation speed with a temporal navigation speed of the virtual environment, and
map the rotation direction with a spatial navigation direction of the virtual environment,
identify a configuration of an interactive application, displayed in the virtual environment projected by the VR device, to be modified in the interactive application, and
modify the configuration of the interactive application based on the one or more physiological parameters the configuration corresponding to one of a speed, a difficulty level, a music level, or sound effects of the interactive application.

14. The VR apparatus of claim 13, wherein the processor is further configured to identify the action, among the plurality of actions, by:
mapping the parameter with the interactive application; and
identifying the action, among the plurality of actions, based on the interactive application and the parameter, the action comprising a control parameter which matches the parameter.

15. The VR apparatus of claim 13, wherein the one or more physiological parameters includes at least one factor related to body status information among a heart rate, a temperature, and a sweat rate, of the user of the VR apparatus.

16. The VR apparatus of claim 13, wherein the interactive application is a game displayed in the virtual environment.

* * * * *